US009613303B2

(12) United States Patent
Tredoux et al.

(10) Patent No.: US 9,613,303 B2
(45) Date of Patent: Apr. 4, 2017

(54) SYSTEM AND METHOD FOR INCORPORATING SECURITY ELEMENTS IN PRINTED DOCUMENTS IN AN INSECURE ENVIRONMENT

(71) Applicant: XEROX CORPORATION, Norwalk, CT (US)

(72) Inventors: Gavan L Tredoux, Penfield, NY (US); Reiner Eschbach, Webster, NY (US); Holly Elizabeth Turner, Rochester, NY (US); Peter J Zehler, Penfield, NY (US)

(73) Assignee: XEROX CORPORATION, Norwalk, CT (US)

( * ) Notice: Subject to any disclaimer, the term of this patent is extended or adjusted under 35 U.S.C. 154(b) by 420 days.

(21) Appl. No.: 13/870,783

(22) Filed: Apr. 25, 2013

(65) Prior Publication Data

US 2014/0320874 A1    Oct. 30, 2014

(51) Int. Cl.
*G06F 3/12*        (2006.01)
*G06K 15/02*    (2006.01)
*G06K 15/00*    (2006.01)

(52) U.S. Cl.
CPC ....... *G06K 15/4095* (2013.01); *G06F 3/1222* (2013.01); *G06F 3/1238* (2013.01); *G06F 3/1244* (2013.01); *G06F 3/1255* (2013.01); *G06K 15/1807* (2013.01); *G06F 3/1267* (2013.01); *G06K 2215/0011* (2013.01)

(58) Field of Classification Search
CPC .... G06F 3/1222; G06F 3/1238; G06F 3/1288; G06F 17/214; G06F 3/1205; G06F 3/1242; G06F 3/1274; G06F 3/1244; G06F 3/1255; G06K 15/4095; G06K 15/1822; G06K 15/4045; G06K 15/1807; H04N 2201/3221; H04N 2201/3269; H04N 2201/3278; H04N 1/32144; H04N 1/00838; H04N 1/00856; H04N 1/00864
USPC .................. 358/1.12–1.15; 726/30
See application file for complete search history.

(56) References Cited

U.S. PATENT DOCUMENTS

| | | | |
|---|---|---|---|
| 6,389,151 B1 * | 5/2002 | Carr et al. ..................... | 382/115 |
| 7,965,422 B2 * | 6/2011 | Hains et al. ................. | 358/3.28 |
| 8,269,987 B2 * | 9/2012 | Eschbach et al. ........... | 358/1.11 |
| 8,610,935 B1 * | 12/2013 | McKinley et al. .......... | 358/1.15 |
| 2004/0080772 A1 * | 4/2004 | Snyders ........................ | 358/1.14 |
| 2006/0244997 A1 * | 11/2006 | Watabe ......................... | 358/1.16 |
| 2008/0259397 A1 * | 10/2008 | Uehara ......................... | 358/1.15 |

(Continued)

*Primary Examiner* — Benny Q Tieu
*Assistant Examiner* — Juan M Guillermety
(74) *Attorney, Agent, or Firm* — MH2 Technology Law Group LLP

(57) ABSTRACT

Systems and methods for secured printing are provided. The method includes receiving a nominally print-ready document with the nominally print-ready document including one or more references to one or more security elements. The method also includes replacing the one or more references with one or more identifiers, to generate an intermediate document, and associating the one or more security elements with the one or more identifiers. The method further includes transmitting instructions to a printing device, with the instructions being configured to cause the printing device to associate the one or more identifiers with the one or more security elements. The operations further include transmitting the intermediate document to the printing device.

20 Claims, 5 Drawing Sheets

(56) References Cited

U.S. PATENT DOCUMENTS

| | | |
|---|---|---|
| 2009/0268241 A1* | 10/2009 | Choi et al. .................. 358/1.15 |
| 2009/0279143 A1* | 11/2009 | St. Jacques et al. ........ 358/3.28 |
| 2011/0283369 A1* | 11/2011 | Green ............................ 726/30 |
| 2012/0170060 A1* | 7/2012 | Nordback ............. G06F 3/1212 |
| | | 358/1.2 |
| 2013/0077124 A1* | 3/2013 | Vojak ........................... 358/1.14 |
| 2013/0100480 A1* | 4/2013 | Ikeda ........................... 358/1.14 |
| 2013/0155441 A1* | 6/2013 | Hong et al. .................. 358/1.14 |
| 2013/0176595 A1* | 7/2013 | Yamada ........................ 358/1.16 |
| 2013/0215474 A1* | 8/2013 | Caton et al. ................. 358/3.28 |
| 2014/0253943 A1* | 9/2014 | Mandaknale et al. ....... 358/1.14 |

* cited by examiner

SYSTEM AND METHOD FOR INCORPORATING SECURITY ELEMENTS IN PRINTED DOCUMENTS IN AN INSECURE ENVIRONMENT

TECHNICAL FIELD

The present disclosure relates generally to systems and methods for secured printing.

BACKGROUND

A variety of techniques are used for detecting and/or preventing tampering with and unauthorized copying or forging of printed documents. Such techniques generally include incorporating security features in printed documents that are difficult to reproduce or reveal document alterations or tampering.

While these security features may sufficiently protect sensitive documents after they have been printed, the features may be susceptible to manipulation during production. For example, a user might capture a visual, digitally-implemented security feature used in a previous document and apply it to subsequent, unauthorized documents. Accordingly, documents with these security features are usually prepared and printed in secured environments, where access to the security features may be restricted, such as in dedicated print shops. In such environments, the devices associated with printing may be secured from unauthorized use, which may prevent tampering with the document while it is being produced.

However, some documents may be more suitable for production in less specialized, and consequently, potentially less-secure sites. For example, small-run productions may be suitable for printing in a more convenient, general-purpose location, such as for example, a government office (e.g., for on-demand printing of licenses, certificates, etc.).

SUMMARY

Embodiments of the disclosure may provide a method for secure printing. The method includes receiving a nominally print-ready document, with the nominally print-ready document including one or more references to one or more security elements. The method also includes replacing the one or more references with one or more identifiers, to generate an intermediate document, and associating the one or more security elements with the one or more identifiers. The method further includes transmitting instructions to a printing device, with the instructions being configured to cause the printing device to associate the one or more identifiers with the one or more security elements. The operations further include transmitting the intermediate document to the printing device.

Embodiments of the disclosure also provide a method for secured printing. The method includes receiving, using a printing device, an association between one or more identifiers and one or more security elements from a server, and associating the one or more identifiers with the one or more security elements. The method also includes receiving an intermediate document including at least one of the one or more identifiers, and applying the one or more security elements associated with the one or more identifiers to the intermediate document so as to generate a secured, printable document. The method also includes printing the secured, printable document.

Embodiments of the present disclosure may further provide a computer system for secured printing. The computer system includes one or more processors, and a memory system including one or more computer-readable media storing instructions that, when executed by at least one of the one or more processors, are configured to cause the computer system to perform operations. The operations include receiving a nominally print-ready document, with the nominally print-ready document including one or more references to one or more security elements. The operations further include replacing the one or more references with one or more identifiers, to generate an intermediate document, and associating the one or more security elements with the one or more identifiers. The operations also include transmitting instructions to a printing device, with the instructions being configured to cause the printing device to associate the one or more identifiers with the one or more security elements. The operations further include transmitting the intermediate document to the printing device.

BRIEF DESCRIPTION OF THE DRAWINGS

The accompanying drawing, which is incorporated in and constitutes a part of this specification, illustrates an embodiment of the present teachings and together with the description, serves to explain the principles of the present teachings.

Figure 1:
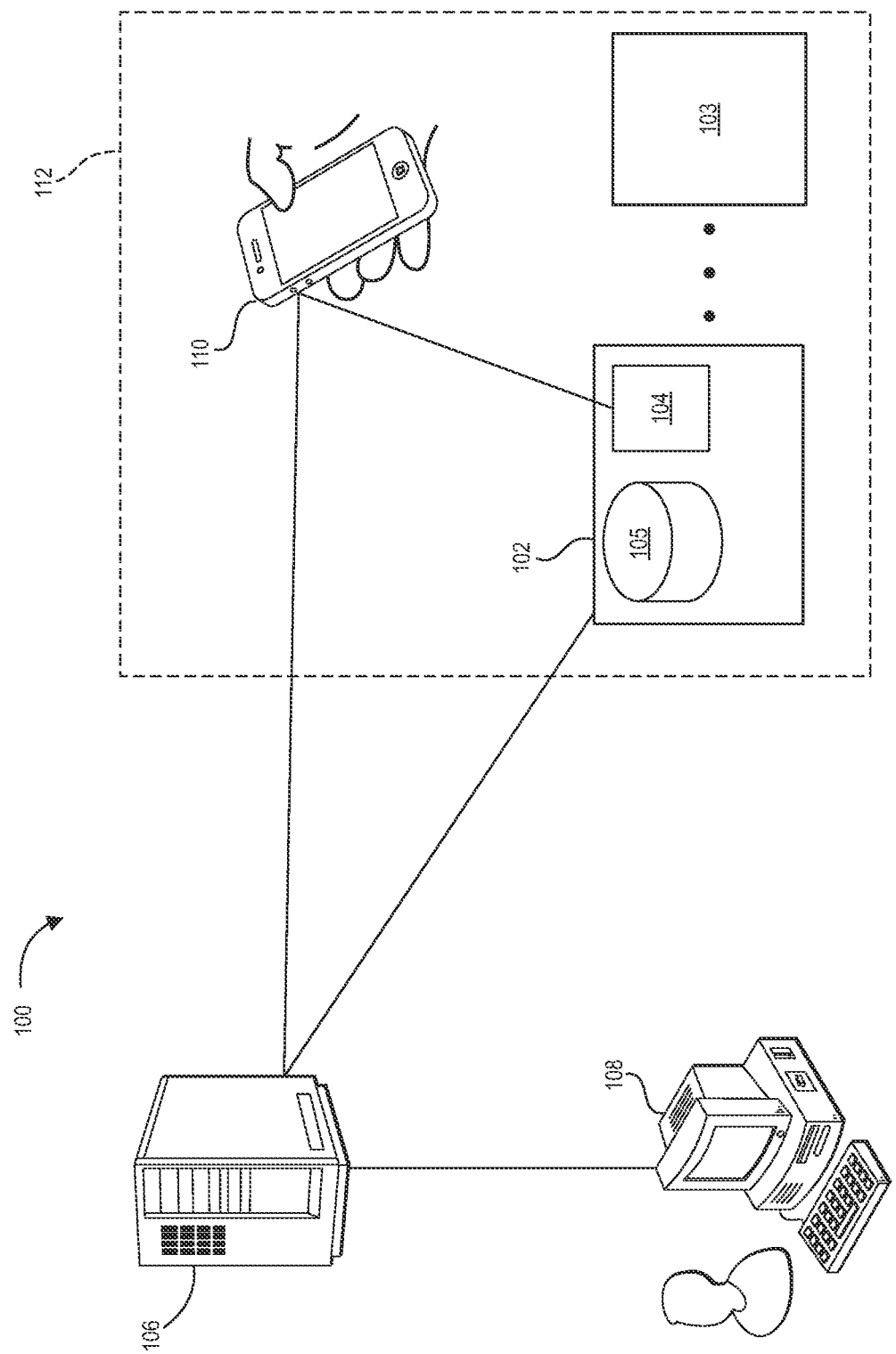
FIG. 1 illustrates a schematic view of a system for secured printing, according to an embodiment.

It should be noted that some details of the figure have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawing. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

In general, the present disclosure is related to systems and methods for secured printing. In an embodiment, the system includes a document processing device (e.g., a computer workstation) that may be employed by a user to create a document. The document may contain references to security elements, but may not contain the actual security elements. This may be referred to as a nominally print-ready document. The nominally print-ready document may be transmitted to a printer server for printing. The printer server generates security identifiers, which are associated with the referenced security elements of the nominally print-ready document. The printer server may substitute the references contained in the nominally print-ready document with the identifiers, generating an intermediate document. The printer server may then send the identifier/security element associations to the printing device, along with the intermediate document. The printing device then constructs the secured document, resolving the identifiers and applying the appropriate security elements.

Thus, the present systems and methods may, in some cases, avoid exposing the security elements to the users at the work stations. Furthermore, in some embodiments, the present systems and methods may avoid relying on a static pairing of references to security elements, which may be exploited by unauthorized access to the printing device. A given identifier/security element pairing may be applicable for one print job (or a specific number of print jobs) and may not be usable in subsequent print jobs. Subsequent print jobs may require generating new identifiers and associating the new identifiers with security elements. With access to the identifier generation and substitution functionality restricted to the printer server, the system may diminish the risk of a user producing unauthorized documents that include the security elements.

Turning now to the specific, illustrated embodiments, FIG. 1 illustrates a simplified schematic view of a system 100 for secured printing, according to an embodiment. The system 100 may include a printing device 102, such as a multi-function device (MFD). In other embodiments, the printing device 102 may be another type of printer, a series or pool of printers, and/or the like. The printing device 102 may be configured to print a document 103, which may contain one or more active security elements that may be designed to prevent or make readily apparent any tampering, alteration of sensitive material, etc. Such active security elements may include gloss marks and/or specialty fonts such as microtext (e.g., text on the order of 250 nm in height), collation marks, infrared text, ultraviolet text, and/or anything else that is difficult to copy or reveals alteration of the document 103.

The printing device 102 may include a verification module 104, which may be capable of detecting a physical proximity of a user to the printing device 102. The verification module 104 may be a radio frequency identification (RFID) tag that is configured for short-range communication, for example, a near-field communication (NFC) tag. In other embodiments, the verification module 104 may be a display and input peripheral (e.g., a touchscreen, screen and keyboard, etc.) capable of displaying a password, quick response (QR) code, bar code, or any other information that may be captured by a physically proximal user (e.g., within a line of sight and/or within reach of the user) and entered, transmitted, or otherwise employed to verify physical proximity of the user to the printing device 102. In yet other embodiments, the verification module 104 may include a magnetic card reader, which may be configured to read a card assigned to a user, a biometric (face recognition, finger print scan, retina scan, etc.) sensor, or a like mechanism configured for verifying proximity of the user and the user's credentials. It will be appreciated that the verification module 104 may be on, in, or around the printing device 102.

The printing device 102 may also include a resource lookup database 105. The resource lookup database 105 may be contained on any suitable computer-readable medium, such as internal volatile or non-volatile memory, disks, flash drives, thumb drives, etc. The resource lookup database 105 may contain one or more tables which associate security identifiers with security elements. For example, a certain security identifier may be associated with a specialty font configured to protect a date (e.g., birthdate, issue date, expiration date, etc.) or any other information on the printed document 103 from alteration. When a print-ready document file containing such a security identifier is provided to the printing device 102, the printing device 102 may thus refer to the resource lookup database 105 and substitute or otherwise apply the security element in place of the security identifier in the document, thereby generating a secured document for printing, as will be described in greater detail below.

The system 100 may also include a printer server 106, which may be configured for communication with the printing device 102 via any suitable communications link. In some embodiments, the printer server 106 may be provided by hardware onboard the printing device 102. In other embodiments, the printer server 106 may separate from the printing device 102 and may be proximal or remote with respect to the printing device 102. In some embodiments, the printer server 106 may be disposed in a physically secured area.

Moreover, the printer server 106 may communicate with the printing device 102 via a local area network (LAN), a wide area network (WAN), the internet, via any suitable communication structure, process, protocol, etc., whether wired, wireless, or a combination thereof. In other embodiments, a direct connection between the printing device 102 and the printer server 106 may be provided, for example, using a universal serial bus (USB) connection between the printing device 102 and the printer server 106. Furthermore, the printer server 106 illustrated may be representative of two or more printer servers 106 working in parallel, for example.

The system 100 may also include one or more document processing devices (one shown 108), which may be a desktop computer, laptop computer, mobile device, any other processing system, or the like. The document processing device 108 may be configured for communication with the printer server 106 via any suitable communications link. Such communications links may be the same or similar as any of those described above with reference to the link between the printer server 106 and the printing device 102; however, for any particular implementation, the two links may or may not be the same.

The document processing device 108 may be configured for preparing documents, for example, using any suitable word processing software. The document processing device 108 may be configured to employ templates with its word processing software, which may incorporate references to security elements (e.g., specialty fonts, gloss marks, or the like), for example, using POSTSCRIPT®, printer command language (PCL), and/or the like.

The system 100 may also include a mobile device 110. In some embodiments, the system 100 may be characterized as communicating with the mobile device 110 rather than including it, but for purposes of description herein, the system 100 is described as including the mobile device 110. As used herein, the term "mobile device" may refer to any type of mobile or standalone device. For example, the mobile device 110 may be provided by one or more of a mobile phone, a tablet device, a notebook device, a personal data assistant (PDA), or the like.

The mobile device 110 may be configured to communicate with one or both of the printer server 106 and the printing device 102. Such communication may proceed by execution of a custom application or "app" loaded on the mobile device 110, by manual command of the mobile device 110, or in any other manner. For example, the mobile device 110 may interact with the verification module 104 when the mobile device 110 is in an area 112 of physical proximity with the printing device 102. In embodiments in which the verification module 104 is an NFC tag, the area 112 may represent an effective range of communication for the NFC tag, and may be configurable before the verification module 104 is deployed, during deployment, or both. The mobile device 110 may be configured to communicate with the NFC tag of the verification module 104 and receive a verification code therefrom. The mobile device 110 may provide the code to the printing device 102 and/or the printer server 106 to verify physical proximity of the mobile device 110 (and, by extension, the user of the mobile device 110) to the printing device 102. In another embodiment, the verification module 104 may display a bar code, QR code, another type of glyph, a passcode, or the like, which the mobile device 110 may capture (via a camera, a keypad, or the like) and provide to the printing device 102 and/or the printer server 106. In still other embodiments, the verification module 104 may be a keypad, which may accept a pre-assigned personal identification number (PIN) from the user, and thus the mobile device 110 may be omitted.

Figure 2:
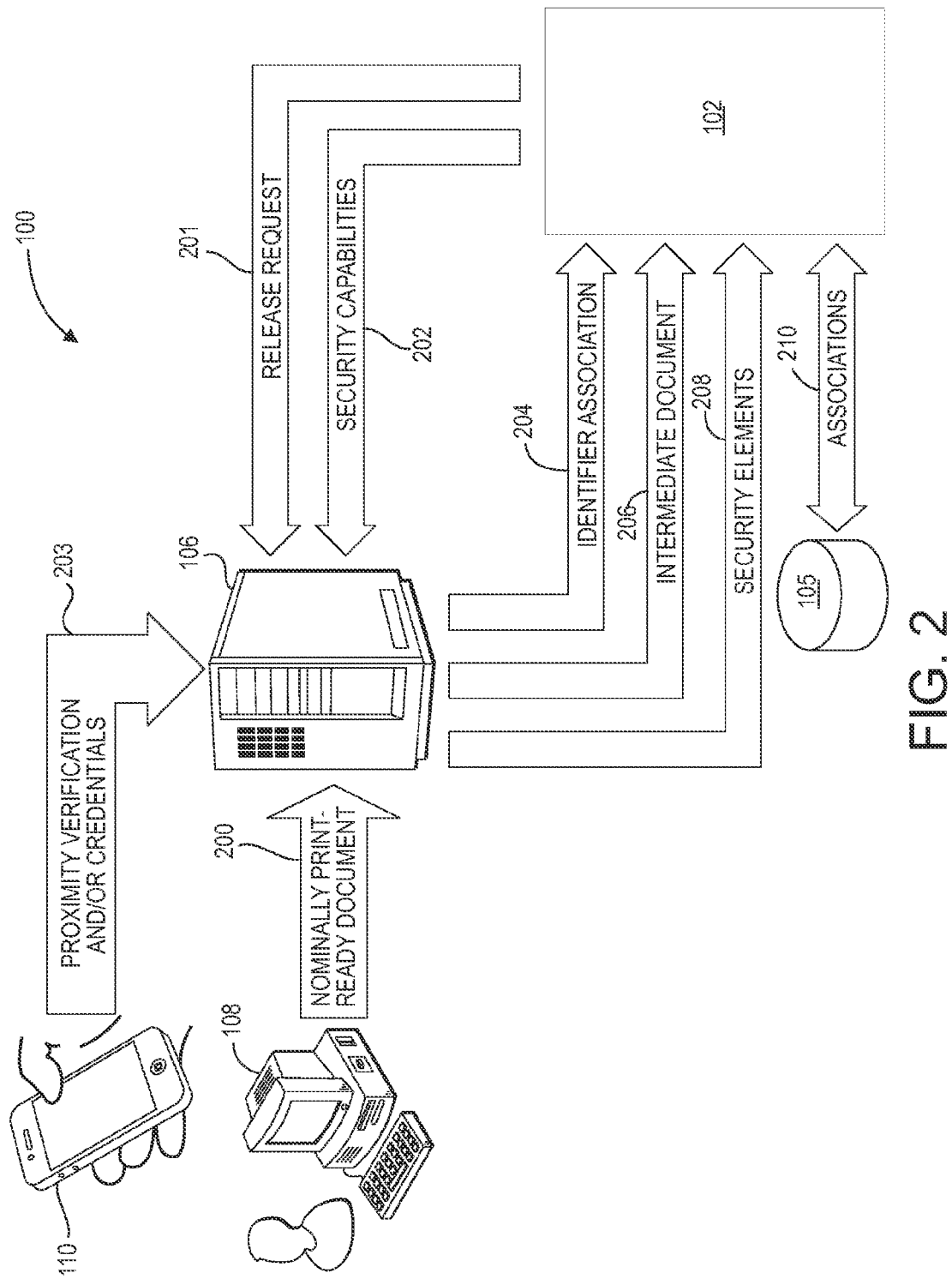
FIG. 2 illustrates a schematic view of operation of the system, according to an embodiment.

FIG. 2 illustrates a simplified schematic view of the system 100, specifically illustrating operation thereof, according to an embodiment. As shown, a user may prepare a nominally print-ready document using the document processing device 108 and transmit it to the printer server 106 for printing, as indicated at 200. The transmission of the print-ready document may or may not specify the particular printing device 102; for example, in some embodiments, the determination of which printing device 102 to print to may be made when the user presents identification at the printing device 102.

The nominally print-ready document may include references to security elements. For example, the nominally print-ready document may contain blank fields, placeholders (e.g., indicating "VOID" or the like), etc. where security elements are to be placed. Such references may thus indicate "inactive" security elements. Moreover, the security element references may identify particular types of information, particular types of security elements, or both which are to be applied to the document, e.g., where the references are located in the document. For example, the type of information may be a date, time, name, seal, or the like. The type of security element may be a specialty font, gloss mark, or the like, as described above.

Figure 3:
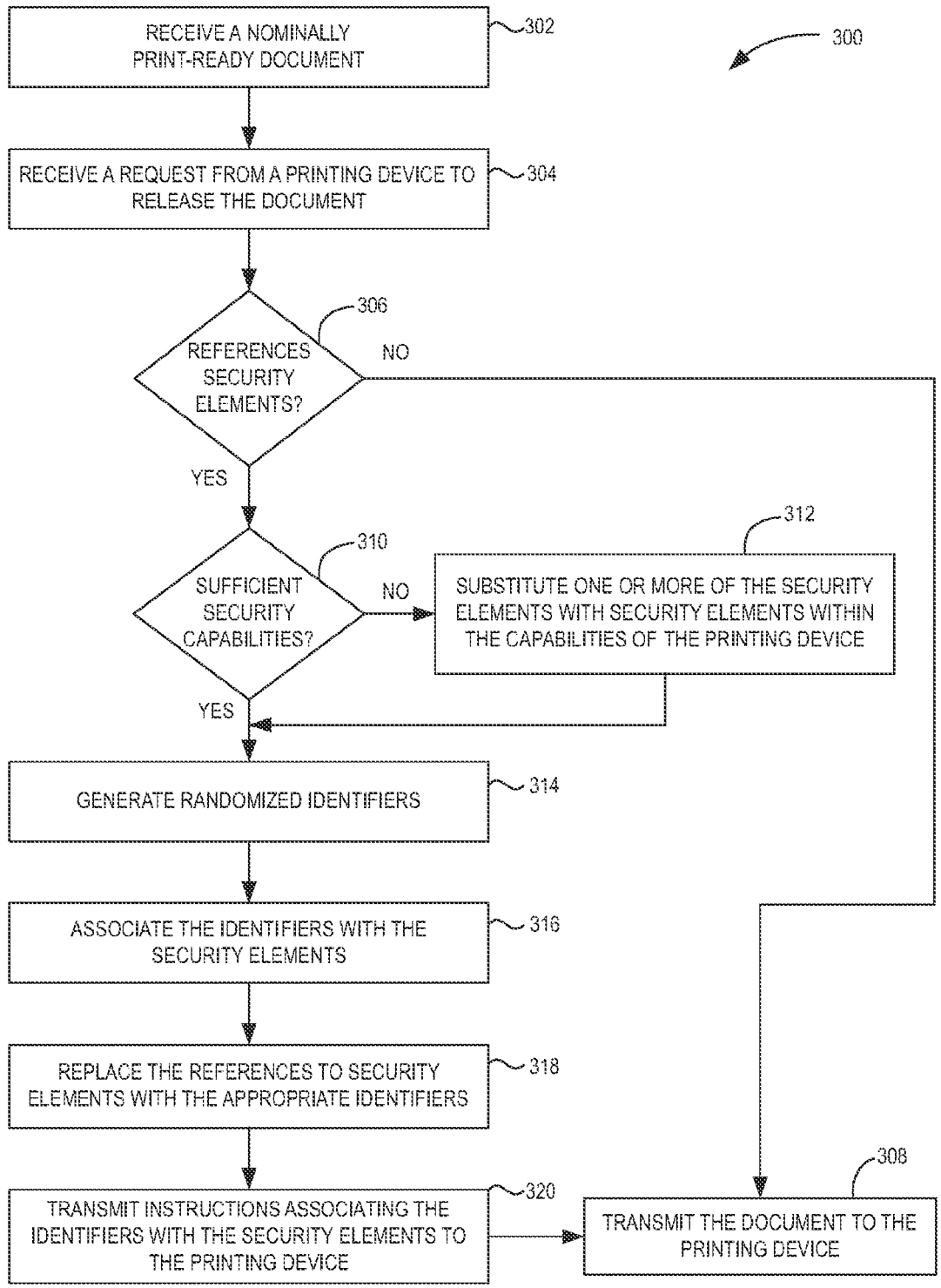
FIG. 3 illustrates a flowchart of a method for secured printing, according to an embodiment.

With continuing reference to FIG. 2, FIG. 3 illustrates a flowchart of a method 300 for secured printing, according to an embodiment. The method 300 may relate, for example, to an operation of the printer server 106, and thus will be described herein with reference thereto. However, it will be appreciated that the method 300 is not intended to be limited to any particular structure unless otherwise expressly stated herein.

The printer server 106 may receive the nominally-print ready document from the document processing device 108, as at 302 (schematically depicted in FIG. 2 at 200). When the printer server 106 receives the nominally print-ready document at 302, the printer server 106 may place the nominally prim-ready document in a queue of print jobs that are yet to be released. Accordingly, the printer server 106 may wait for a request to release the nominally print-ready document, for example, from the printing device 102, as at 304 and also shown at 201 in FIG. 2. Although illustrated as being received from the printing device 102, the request for release may come instead or additionally from the mobile device 110.

In some embodiments, the printer server 106 may receive a verification that the user is physically proximal to the printing device 102, as shown at 203 in FIG. 2. The printer server 106 may also receive credentials associated with a user, which may be employed to determine that a particular user has authorization to use one or more functions of the printing device 102. As shown in FIG. 2, the proximity verification and/or user credentials may be transmitted by the mobile device 110, but in other embodiments may be transmitted by the printing device 102.

Moreover, the request for release received at 304 may include an indication of a selected printing device 102. For example, a network may contain a plurality of printing devices 102, which may be dispersed throughout a building or in multiple buildings. In some instances, the document processing device 108 may indicate a selected printing device 102 with the transmission of the nominally print-ready document, but in other embodiments, it may not. In at least the latter case, the nominally print-ready document may be associated with a user (e.g., via a user ID). The user may then enter and/or transmit credentials upon arrival at the desired printing device 102 such that the printer server 106 may select the nominally print-ready document from the print queue and prepare to send the document to the printing device 102. Any suitable scheme for identifying an appropriate printer may be employed without departing from the scope of the present disclosure. Further, the print server may verify the identity of the printing device 102 using public key infrastructure (PKI) or the like and a chain of certificate trust.

With the nominally print-ready document received at 302, any verifications, credentials, and/or release requests received at 304, and the printing device 102 selected, the printer server 106 implementing the method 300 may proceed to determining whether the nominally print-ready document contains references to security elements, as at 306. If the printer server 106 determines that the nominally print-ready document does not include references to security elements, the printer server 106 may pass the document to the printing device 102, as at 308, for example, without further security processing. Such transmission may proceed by secured print submission protocol such as WS-Print over https.

However, if the nominally print-ready document is determined to include references to security elements at 306, the method 300 may proceed to the printer server 106 determining whether the selected printing device 102 has sufficient capabilities to implement the security elements referenced in the nominally print-ready document, as at 310. To achieve this, the printer server 106 may interrogate the printing device 102 to determine what its full capabilities are or whether it is able to provide the specific security elements referenced in the nominally print-ready document.

The printing device 102 may respond, as shown at 202 in FIG. 2, by transmitting information indicative of its security capabilities to the printer server 106. Such response may include a list of security element capabilities of the printing device 102 and/or a yes/no indication as to whether the printing device 102 has the capability to apply specific security elements (e.g., those referenced in the nominally print-ready document). Such response may occur during set-up of the printing device 102, after upgrades or other maintenance of the printing device 102, periodically, upon startup of the printing device 102, in response to interrogation by the printer server 106, a combination thereof, or the like. The printer server 106 may interrogate the printing device 102 each time a new request for release for a document that contains references to security elements is received and the printing device 102 is selected, periodically, or upon any other trigger. In some embodiments, the printer server 106 may retain a database of printing device 102 capabilities that the printer server 106 may refer to, rather than or in addition to interrogating the printing device 102 for each print job.

If the printer server 106 determines at 310 that the printing device 102 lacks capabilities to apply one or more of the security elements referenced in the, the printer server 106 may, for example, substitute one or more of the security elements referenced in the nominally print-ready document with security elements that are within the capabilities of (i.e., supported by) the printing device 102, as at 312. This may proceed by modifying the references in the nominally print-ready document, changing the interpretation of the references by the printer server 106, or in any other manner such that the references in the nominally print-ready document may or may not be modified. In some cases, the substitution at 312 may proceed after an intermediate document is generated from the nominally-print ready document, as will be described in greater detail below.

In some embodiments, the printer server 106 may additionally or instead seek out an alternative printing device 102 that has capabilities sufficient to apply the security features referenced in the nominally print-ready document. For example, the printer server 106 may search for printing devices 102 that are physically proximal to the selected printing device 102 and then suggest an alternative printing device 102 via transmission of data to the mobile device 110, the selected printing device 102, the document processing device 108, or any combination thereof. Moreover, in some embodiments, if the printer server 106 determines that the printing device 102 lacks sufficient capabilities, the printer server 106 may cause an error message to be displayed at the printing device 102, the mobile device 110, and/or the document processing device 108, and/or may cause the printing device 102 to print the document with error messages indicating that the desired security elements have not been implemented.

On the other hand, if the printer server 106 determines that the selected printing device 102 does have sufficient security capabilities to apply the security elements referenced in the nominally print-ready document (either as original or as altered at 312), the method 300 may proceed to the printer server 106 generating one or more security identifiers for each of the security elements referenced in the nominally print-ready document, as at 314. In some embodiments, an individual identifier may be generated for each reference. In other cases, an individual identifier may be generated for each security element, with the nominally print-ready document potentially containing multiple references to the same security reference (e.g., a reference to a gloss mark on every page of a multiple page document). Either may be referred to as generating identifiers for the references. Moreover, the identifiers may be randomly generated sequences of letters, numbers, and/or images.

The identifiers may then be associated with the security elements to which the references refer, as at 316. This may be accomplished by providing a table in a computer-readable medium accessible to the printer server 106. The table may map the identifiers to the security elements, thereby associating the two. The method 300 may then proceed to the printer server 106 applying the identifiers to the nominally print-ready document to generate an intermediate document, as at 318. The identifiers may be applied by substituting the references to the security elements in the nominally print-ready document with the identifiers associated with the security elements at 316. In other embodiments, the identifiers may be added to the references in the nominally print-ready document.

The printer server 106 may then proceed to transmitting identifier and security element associations to the printing device 102, as at 320. Sending the identifier and security element associations is schematically depicted in FIG. 2 at 204. Such transmission may proceed by providing the table of the mapped associations between the identifiers and the security elements directly to the printing device 102, e.g., via a secured connection. The transmission may also include transmitting instructions to the printing device 102, with the instructions configured to cause the printing device 102 to alter one or more portions of the lookup table of the database 105. For example, the lookup table of the database 105 may be or include a font substitution table, linking the specialty, security fonts with the security identifiers. Accordingly, the printer server 106 may transmit instructions to the printing device 102 configured to cause the printing device 102 to associate a particular specialty font with one of the identifiers generated at 314. In some embodiments, the specialty font (or any other security elements) may be provided to the printing device 102 for each individual print job, and then may be deleted therefrom to avoid unauthorized access.

The printer server 106 implementing the method 300 may then proceed to transmitting the document as at 308; however, in this transmission, the document may be the intermediate document. The transmission of the intermediate document is also shown in FIG. 2 at 206. The printing device 102 may use the lookup table of the database 105 to replace the identifiers with the appropriate security elements to generate a printable, secured document.

Figure 4:
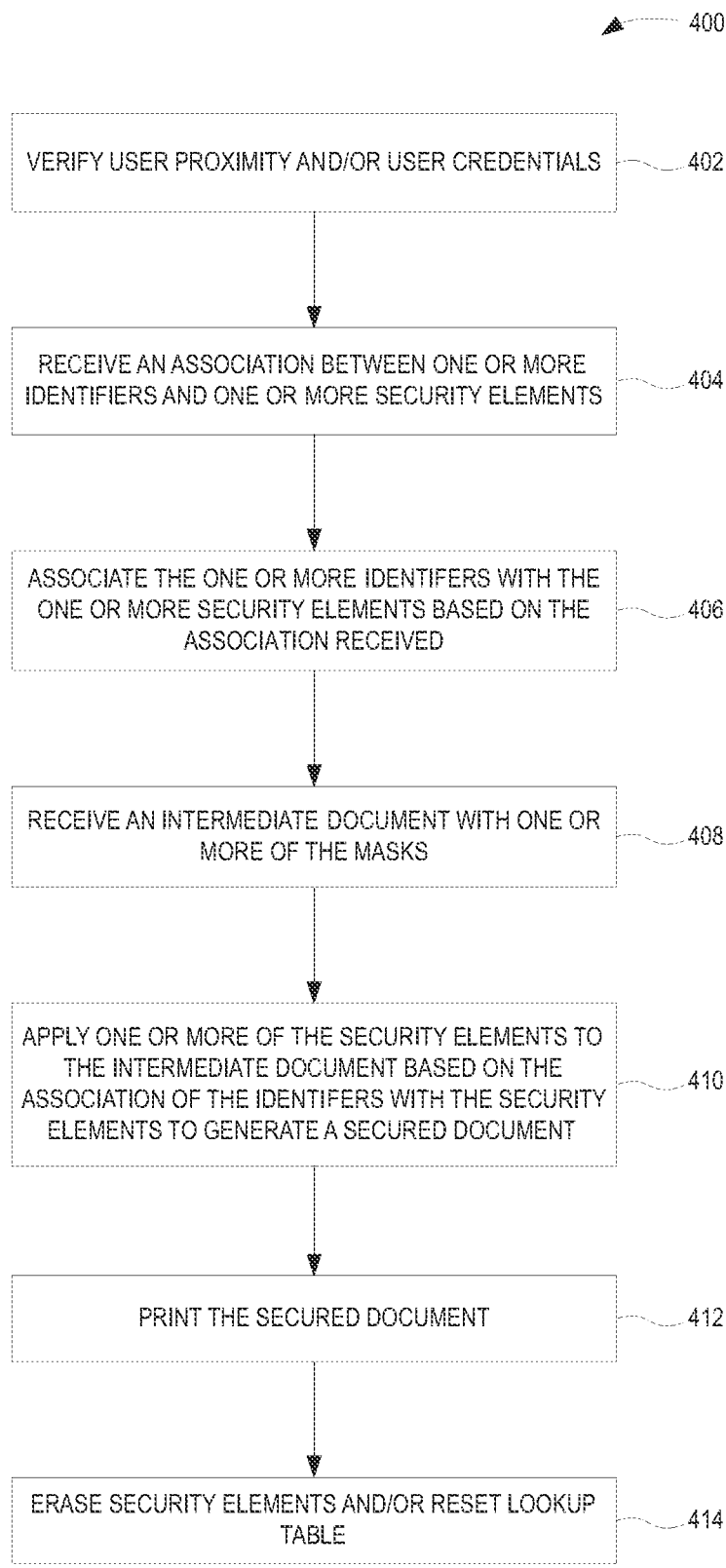
FIG. 4 illustrates a flowchart of another method for secured printing, according to an embodiment.

Turning to the operation of the printing device 102 in greater detail, with continuing reference to FIG. 2, FIG. 4 illustrates a flowchart of a method 400 for secured printing, according to an embodiment. Although the method 400 is described with reference to the system 100 and the printing device 102, it will be appreciated that the method 400 may apply to any system and is not intended to be limited to any particular device, structure, hardware, etc., unless otherwise specifically stated herein. Moreover, embodiments of the method 400 may be configured for use with the method 300.

The method 400 may include the printing device 102 verifying the proximity of a user to the printing device 102 and/or gathering or otherwise verifying user credentials, as at 402. Verifying user proximity may proceed by operation of the verification module 104 (FIG. 1), which, as described above, may function to determine whether a user is within an area 118 (FIG. 1) of proximity to the printing device 102. Such verification may take the form of electronic communication with an NFC tag or other device of the verification module 104, or may include receiving a PIN, displayed password, etc. The printing device 102 may also collect user identification information, for example, via receiving a PIN, username, password, digital certificate, etc. by receiving such data through a display and keypad or via communication with the mobile device 110 loaded with the user's credentials. The printing device 102 may then transmit an indication of the verification to the printer server 106 and/or may be unlocked for use by the user. In some embodiments, however, the user may provide verification of physical proximity to the printer server 106 via the mobile device 110, as shown in FIG. 2, or any other device, communication therewith, in such embodiments, the printing device 102 may verify the user proximity and/or credentials by receiving an indication of verification from the mobile device 110, the printer server 106, or another device. In other embodiments, the printing device 102 may not receive a verification indication from another device, but may simply wait for the printer server 106 to transmit data for printing.

The printing device 102 implementing an embodiment of the method 400 may then proceed to receiving an association between one or more identifiers and one or more security elements, as at 404. The identifiers, as mentioned above, may be randomly generated for each print job and thus may not be previously associated with any security elements. The receiving of the associations is schematically depicted in FIG. 2 at 204.

The printing device 102 may associate, as at 406, the one or more identifiers with the one or more security elements based on the association received at 404. In various implementations the identifiers may each be associated with a single, unique security element, such that a single intermediate document may contain several of the same identifier; however, in other implementations, several different identifiers may be associated with a single security element. In the latter implementations, the intermediate document may or may not include duplicative identifiers. Moreover, the printing device 102 may alter the lookup table of the database 105 to reflect the associations. The alteration of the database 105, which may be a part of the printing device 102, is schematically depicted in FIG. 2 at 210.

Before, during, or after associating the identifiers with the security elements, the printing device 102 may receive the intermediate document, as at 408, from the printer server 106. The intermediate document may be an altered version of the nominally print-ready document, with the references to security elements having been replaced or augmented with the identifiers associated therewith, as described above. The receiving of the intermediate document is schematically depicted in FIG. 2 at 206.

The printing device 102 implementing the method 400 may then proceed to applying the one or more security elements to the intermediate document, based on the identifiers and the associations thereof, as at 410. Such application may proceed by the printing device 102 substituting the each identifier with the associated security element, as indicated in the lookup table of the database 105. In one specific example, the printing device 102 may replace a blank text field associated with an identifier with text having a tamper-resistant specialty font. In some embodiments, the printing device 102 may also receive one or more security elements from the printer server 106, for example, the printing device 102 may receive one or more specialty fonts, marks, etc., associate them with the appropriate identifiers, and apply as indicated in the intermediate document. The receiving of such security elements from the printer server 106 is schematically depicted in FIG. 2 at 208.

When the identifiers are resolved and the appropriate security elements applied, the intermediate document may be characterized as having been converted to a secured, printable document. Accordingly, the printing device 102 may proceed to printing the secured, printable document, as at 412. In some cases, this may be the end of the method 400. However, in other cases, the method 400 may also include erasing any security elements received from the printer server 106 as part of the print job, as at 414, thereby preventing later, unauthorized access to the security elements. Such erasing may be prompted by receiving instructions from the printer server 106 for the printing device 102 to effect such erasure. In other embodiments, the completion of the generation of the secured, printable document may trigger the erasure. Moreover, the printing device 102 may reset its lookup table of the database 105 at 414, e.g., after completing one or a specified number of print jobs, such that the print job 102 has no memory of the pairing between the random identifiers and the security elements.

Figure 5:
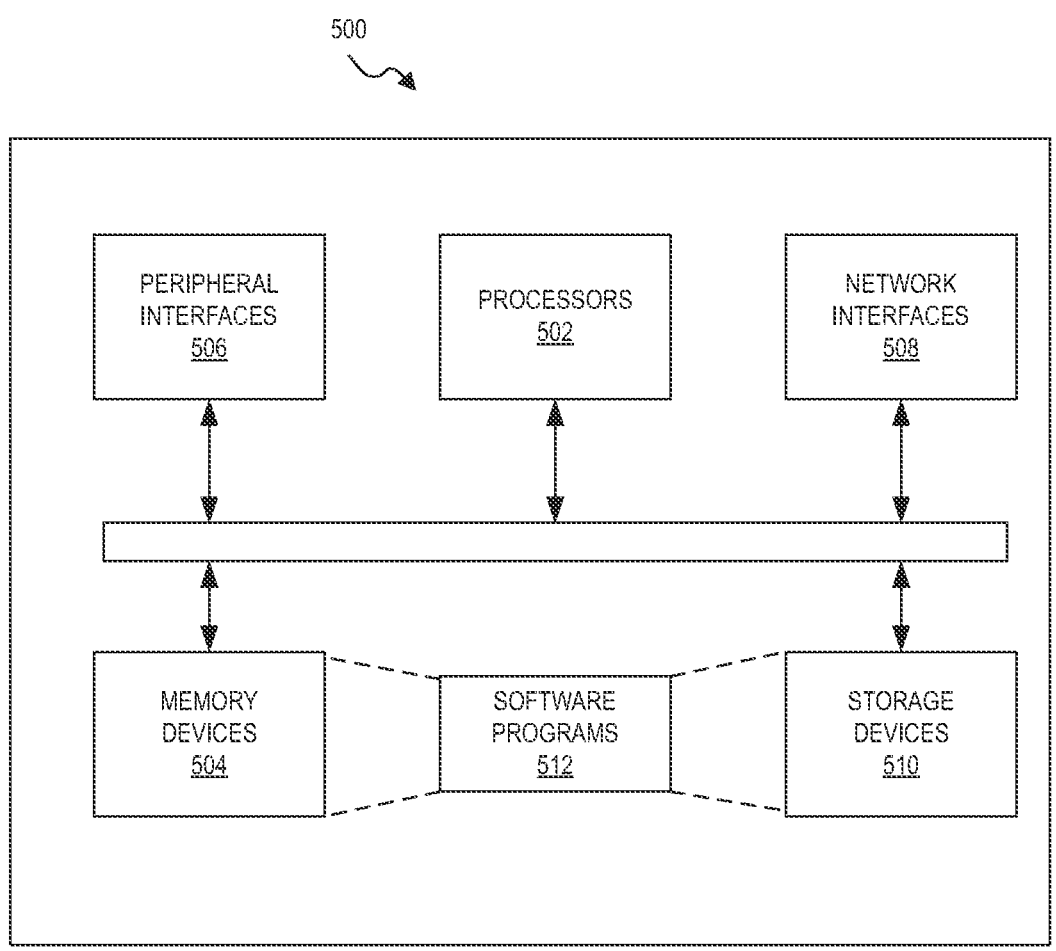
FIG. 5 illustrates a schematic view of a processor system, according to an embodiment.

Embodiments of the disclosure may also include one or more processor (i.e., computer) systems which may be implemented by the system 100, portions thereof, or partially implemented one or more processor systems. FIG. 5 illustrates a schematic view of such a processor system 500, according to an embodiment. The printing device 102, printer server 106, document processing device 108, and mobile device 110 may each include one or more instances of the processor system 500; however, in some embodiments, a single processor system 500 may be configured to provide two or more of these components, and/or any of these components may be provided by two or more processor systems 500, for example, operating in parallel.

The processor system 500 may include one or more processors 502 of varying core (including multiple cores) configurations and clock frequencies. The one or more processors 502 may be operable to execute instructions, apply logic, etc. It will be appreciated that these functions may be provided by multiple processors or multiple cores on a single chip operating in parallel and/or communicably linked together. In one embodiment, the system 100 may include a single processor 502 configured to perform each function associated with the printer server 106 and printing device 102; however, in other embodiments, these may be each be associated with one or more distinct processors 502. Similarly, the mobile device 110 may include one or more such processors 502.

The processor system 500 may also include a memory system, which may be or include one or more memory devices and/or computer-readable media 504 of varying physical dimensions, accessibility, storage capacities, etc. such as flash drives, hard drives, disks, random access memory, etc., for storing data, such as images, files, and program instructions for execution by the processor 502. In an embodiment, the computer-readable media 504 may store instructions that, when executed by the processor 502, are configured to cause the processor system 500 to perform operations. For example, execution of such instructions may cause the processor system 500 to implement one or more portions and/or embodiments of the methods 300 and/or 400 described above.

The processor system 500 may also include one or more network interfaces 508, which may, in an embodiment, carry out the communication between the printing device 102, mobile device 110, and/or the printer server 106. The network interfaces 508 may include any hardware, applications, and/or other software. Accordingly, the network interfaces 508 may include Ethernet adapters, wireless transceivers, PCI interfaces, and/or serial network components, for communicating over wired or wireless media using protocols, such as Ethernet, wireless Ethernet, etc.

The processor system 500 may further include one or more peripheral interfaces 506, for communication with a display screen, projector, keyboards, mice, touchpads, sensors, other types of input and/or output peripherals, and/or the like. In some implementations, the components of processor system 500 need not be enclosed within a single enclosure or even located in close proximity to one another, but in other implementations, the components and/or others may be provided in a single enclosure.

The memory device 504 may be physically or logically arranged or configured to store data on one or more storage devices 510. The storage device 510 may include one or more file systems or databases in any suitable format. The storage device 510 may also include one or more software programs 512, which may contain interpretable or executable instructions for performing one or more of the disclosed processes. When requested by the processor 502, one or more of the software programs 512, or a portion thereof, may be loaded from the storage devices 510 to the memory devices 504 for execution by the processor 502.

Those skilled in the art will appreciate that the above-described cot is merely one example of a hardware configuration, as the processor system 500 may include any type of hardware components, including any necessary accompanying firmware or software, for performing the disclosed implementations. The processor system 500 may also be implemented in part or in whole by electronic circuit components or processors, such as application-specific integrated circuits (ASICs) or field-programmable gate arrays (FPGAs).

The foregoing description of several possible embodiments has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 500 may be used to execute programs according to instructions received from another program or from another computing system altogether. Similarly, commands may be received, executed, and their output returned entirely within the processing and/or memory of the processor system 500. Accordingly, neither a visual interface command terminal nor any terminal at all is strictly necessary for performing the described embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents.

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method for secure printing, comprising:
receiving a nominally print-ready document, wherein the nominally print-ready document comprises one or more references to one or more security elements;
associating the one or more security elements with one or more identifiers of security elements;
generating an intermediate document by substituting the one or more references with the one or more identifiers of security elements;
transmitting instructions to a printing device, wherein the instructions are configured to cause the printing device to generate a secured printable document from the intermediate document by replacing the one or more identifiers of security elements with the associated one or more security elements; and
transmitting the intermediate document to the printing device.

2. The method of claim 1, wherein associating the one or more security elements with the one or more identifiers of security elements comprises:
determining that the printing device lacks one or more security capabilities associated with at least one of the one or more security elements; and
substituting the at least one of the one or more security elements with one or more alternative security elements that are supported by the printing device.

3. The method of claim 1, further comprising:
receiving a verification that a user is in physical proximity to the printing device prior to transmitting the intermediate document to the printing device.

4. The method of claim 1, further comprising:
receiving an identification of a user of the printing device, prior to transmitting the intermediate document; and
selecting the nominally print-ready document from a print job queue using the identification of the user.

5. The method of claim 1, wherein associating the one or more security elements with the one or more identifiers of security elements comprises associating each of the one or more security elements with a unique one of the one or more identifiers of security elements.

6. The method of claim 1, the one or more security elements comprise specialty fonts, gloss marks, or both.

7. The method of claim 1, wherein the instructions are further configured to cause the printing device to alter a resource lookup table to link the one or more identifiers of security elements to the one or more security elements.

8. The method of claim 1, further comprising:
transmitting at least one of the one or more the security elements to the printing device;
determining that the printing device has printed the document; and
transmitting instructions to the printing device configured to cause the printing device to delete the at least one of the one or more security elements.

9. The method of claim 1, wherein:
the nominally print-ready document does not include any of the security elements; and
the method further comprises determining the one or more identifiers of security elements solely for a single print job of the nominally print-ready document.

10. A method for secured printing, comprising:
receiving from a server, by a printing device, an association between identifiers and security elements applicable to only to a single print job for a nominally print-ready document provided by a user;

receiving, by the printing device, an intermediate document for the print job, wherein:
the intermediate document comprises at least one of the identifiers, and the nominally print-ready document provided by the user;
the at least one of the identifiers substitute for at least one reference to at least one of the security elements included in the nominally print-ready document;
generating, by the printing device, a secured printable document from the intermediate document by replacing the at least one of the identifiers with the at least one of the security elements based on the received association between the identifiers and the security; and
printing, by the printing device, the secured, printable document.

11. The method of claim 10, further comprising:
verifying that a user is in physical proximity to the printing device; and
transmitting a verification indicating that the user is in physical proximity to the server, wherein receiving the association, the intermediate document, or both is in response to transmitting the verification.

12. The method of claim 10, further comprising:
verifying that a user is physically proximate to the printing device and has authorization credentials; and
transmitting a verification indicating that the user is in physical proximity to the server and has the authorization credentials, wherein receiving the association, the intermediate document, or both is in response to transmitting the verification.

13. The method of claim 10, further comprising:
receiving at least a portion of at least one of the security elements from the server; and
deleting the at least a portion of the at least one of the security elements after printing the secured, printable document.

14. The method of claim 10, wherein the security elements comprise a specialty font, gloss marks, or both.

15. A computer system for secured printing, comprising:
one or more processors; and
a memory system comprising one or more computer-readable media storing instructions that, when executed by at least one of the one or more processors, are configured to cause the computer system to perform operations, the operations comprising:
receiving a nominally print-ready document, wherein the nominally print-ready document comprises one or more references to one or more security elements
associating the one or more security elements with one or more identifiers;
generating an intermediate document by substituting the one or more references with the one or more identifiers of security elements;
transmitting instructions to a printing device, wherein the instructions are configured to cause the printing device to generate a secured printable document from the intermediate document by replacing the one or more identifiers of security elements with the one or more security elements; and
transmitting the intermediate document to the printing device.

16. The computer system of claim 15, wherein associating the one or more security elements with the one or more identifiers comprises:
determining that the printing device lacks one or more security capabilities associated with at least one of the one or more security elements; and
substituting the at least one of the one or more security elements with one or more alternative security elements that are supported by the printing device.

17. The computer system of claim 15, wherein the operations further comprise:
receiving a verification that a user is in physical proximity to the printing device prior to transmitting the intermediate document to the printing device for printing.

18. The computer system of claim 15, wherein the operations further comprise:
receiving an identification of a user of the printing device, prior to transmitting the intermediate document; and
selecting the nominally print-ready document from a print job queue using the identification of the user.

19. The computer system of claim 15, wherein associating the security elements with identifiers of security elements comprises associating each of the one or more security elements with a unique one of the identifiers of security elements.

20. The computer system of claim 15, wherein:
the nominally print-ready document does not include any of the security elements; and
the operations further comprise determining the one or more identifiers of security elements solely for a single print job of the nominally print-ready document.

* * * * *